United States Patent
Pasini et al.

(10) Patent No.: US 11,068,468 B2
(45) Date of Patent: Jul. 20, 2021

(54) EXTENSIBLE VALIDATION FRAMEWORK

(71) Applicant: ADP, LLC, Roseland, NJ (US)

(72) Inventors: Bruno Macedo Pasini, New York, NY (US); Adam Balchunas, New York, NY (US); Jude Murphy, New York, NY (US)

(73) Assignee: ADP, LLC, Roseland, NJ (US)

(*) Notice: Subject to any disclaimer, the term of this patent is extended or adjusted under 35 U.S.C. 154(b) by 178 days.

(21) Appl. No.: 16/369,624

(22) Filed: Mar. 29, 2019

(65) Prior Publication Data

US 2020/0311048 A1     Oct. 1, 2020

(51) Int. Cl.
*G06F 16/23*     (2019.01)

(52) U.S. Cl.
CPC ...... *G06F 16/2365* (2019.01); *G06F 16/2379* (2019.01)

(58) Field of Classification Search
CPC .................................................. G06F 16/2365
USPC .......................................................... 707/802
See application file for complete search history.

(56) References Cited

U.S. PATENT DOCUMENTS

| | | | |
|---|---|---|---|
| 6,535,883 B1 | 3/2003 | Lee et al. | |
| 7,913,159 B2 | 3/2011 | Larcheveque et al. | |
| 9,582,488 B2 | 2/2017 | Di Blas et al. | |
| 2009/0013408 A1 | 1/2009 | Schipka | |
| 2013/0254168 A1 | 9/2013 | Leman | |
| 2014/0380273 A1* | 12/2014 | Sabbouh | G06F 8/31 717/114 |
| 2019/0171438 A1* | 6/2019 | Franchitti | G06N 5/022 |
| 2019/0327271 A1* | 10/2019 | Saxena | G06N 3/0454 |
| 2019/0392070 A1* | 12/2019 | Johnson | G06F 16/2443 |
| 2020/0293916 A1* | 9/2020 | Li | G06N 5/025 |

FOREIGN PATENT DOCUMENTS

| | | |
|---|---|---|
| CN | 105868050 A | 8/2016 |
| EP | 3211853 A1 | 8/2017 |

* cited by examiner

*Primary Examiner* — Syling Yen
(74) *Attorney, Agent, or Firm* — Yee & Associates, P.C.

(57) ABSTRACT

A method, apparatus, and computer program product for validating a structured data object. A computer system identifies rules for validating interrelationships among data nodes. The data nodes are composable into structured data objects according to a domain specific language. The validation rules are topologically sorted according to dependency relationships declared therein. The computer system receives the structured data object, which consists of interrelated data nodes. The structured data object is traversed according to a traversal algorithm that tracks dependency relationships. Each data node is inserted into a queue according to the traversal algorithm. For each data node in the queue, a subset of the validation rules is identified. The subset is run within a context of the structured data object. Rule failure for the data node are recorded, and a failure report is generated that indicates failure results for each data node.

21 Claims, 7 Drawing Sheets

EXTENSIBLE VALIDATION FRAMEWORK

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for validating a structured data object.

2. Background

Increasingly, businesses rely on business rule interpreters to conduct Internet-based business, or to generate browser-based software programs for others to use in the conduct of business. However, such programs can be complex and can be undesirably slow to compile and/or execute in real-time, especially on a web browser when communication with a remote computer is desirable or necessary. Thus, solutions for increasing the speed of operation of a computer to create and execute business rules are desirable.

SUMMARY

An embodiment of the present disclosure provides a method for validating a structured data object. A computer system identifies a set of validation rules for validating interrelationships among data nodes. The data nodes are composable into structured data objects according to a domain specific language. The computer system topologically sorts the set of validation rules according to dependency relationships declared in the set of validation rules. The computer system receives the structured data object. The structured data object consists of a set of data nodes that are interrelated within the structured data object. The computer system traverses the structured data object according to a traversal algorithm. The traversal algorithm tracks dependency relationships among the set of data nodes. The computer system inserts each data node of the set of data nodes into a queue according to the traversal algorithm. For each data node in the queue, the computer system identifies a subset of a validation rules that should be run on the corresponding data node. The computer system runs the subset of validation rules within a context of the structured data object. Responsive to identifying a rule failure by the data node, the computer system records the rule failure for the data node. The computer system generates failure report. The failure report indicates failure results for each data node of the set of data nodes for the structured data object.

Another embodiment of the present disclosure provides a computer program product for validating a set of metadata objects. The computer program product comprises a non-transitory computer readable storage media and program code, stored on the computer readable storage media. The program code includes code for identifying a set of validation rules for validating interrelationships among data nodes. The data nodes are composable into structured data objects according to a domain specific language. The program code includes code for topologically sorting the set of validation rules according to dependency relationships declared in the set of validation rules. The program code includes code for receiving the structured data object. The structured data object consists of a set of data nodes that are interrelated within the structured data object. The program code includes code for traversing the structured data object according to a traversal algorithm. The traversal algorithm tracks dependency relationships among the set of data nodes. The program code includes code for inserting each data node of the set of data nodes into a queue according to the traversal algorithm. The program code includes code for identifying a subset of a validation rules that should be run on the corresponding data node. The program code includes code for running the subset of validation rules within a context of the structured data object. The program code includes code for recording the rule failure for the data node in response to identifying a rule failure by the data node. The program code includes code for generating a failure report. The failure report indicates failure results for each data node of the set of data nodes for the structured data object.

Yet another embodiment of the present disclosure provides a computer system. The computer system comprises a hardware processor and a validation engine in communication with the hardware processor. The validation engine identifies a set of validation rules for validating interrelationships among data nodes. The data nodes are composable into structured data objects according to a domain specific language. The validation engine topologically sorts the set of validation rules according to dependency relationships declared in the set of validation rules. The validation engine receives the structured data object. The structured data object consists of a set of data nodes that are interrelated within the structured data object. The validation engine traverses the structured data object according to a traversal algorithm. The traversal algorithm tracks dependency relationships among the set of data nodes. The validation engine inserts each data node of the set of data nodes into a queue according to the traversal algorithm. For each data node in the queue, the validation engine identifies a subset of a validation rules that should be run on the corresponding data node. The validation engine runs the subset of validation rules within a context of the structured data object. The validation engine records the rule failure for the data node in response to identifying a rule failure by the data node. The validation engine generates failure report. The failure report indicates failure results for each data node of the set of data nodes for the structured data object.

The features and functions can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a method, an apparatus, and a computer program product for validating a structured data object. In one illustrative example, a computer system identifies a set of validation rules for validating interrelationships among data nodes. The data nodes are composable into structured data objects according to a domain specific language. The computer system topologically sorts the set of validation rules according to dependency relationships declared in the set of validation rules. The computer system receives the structured data object. The structured data object consists of a set of data nodes that are interrelated within the structured data object. The computer system traverses the structured data object according to a traversal algorithm. The traversal algorithm tracks dependency relationships among the set of data nodes. The computer system inserts each data node of the set of data nodes into a queue according to the traversal algorithm. For each data node in the queue, the computer system identifies a subset of a validation rules that should be run on the corresponding data node. The computer system runs the subset of validation rules within a context of the structured data object. Responsive to identifying a rule failure by the data node, the computer system records the rule failure for the data node. The computer system generates failure report. The failure report indicates failure results for each data node of the set of data nodes for the structured data object.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

Figure 1:
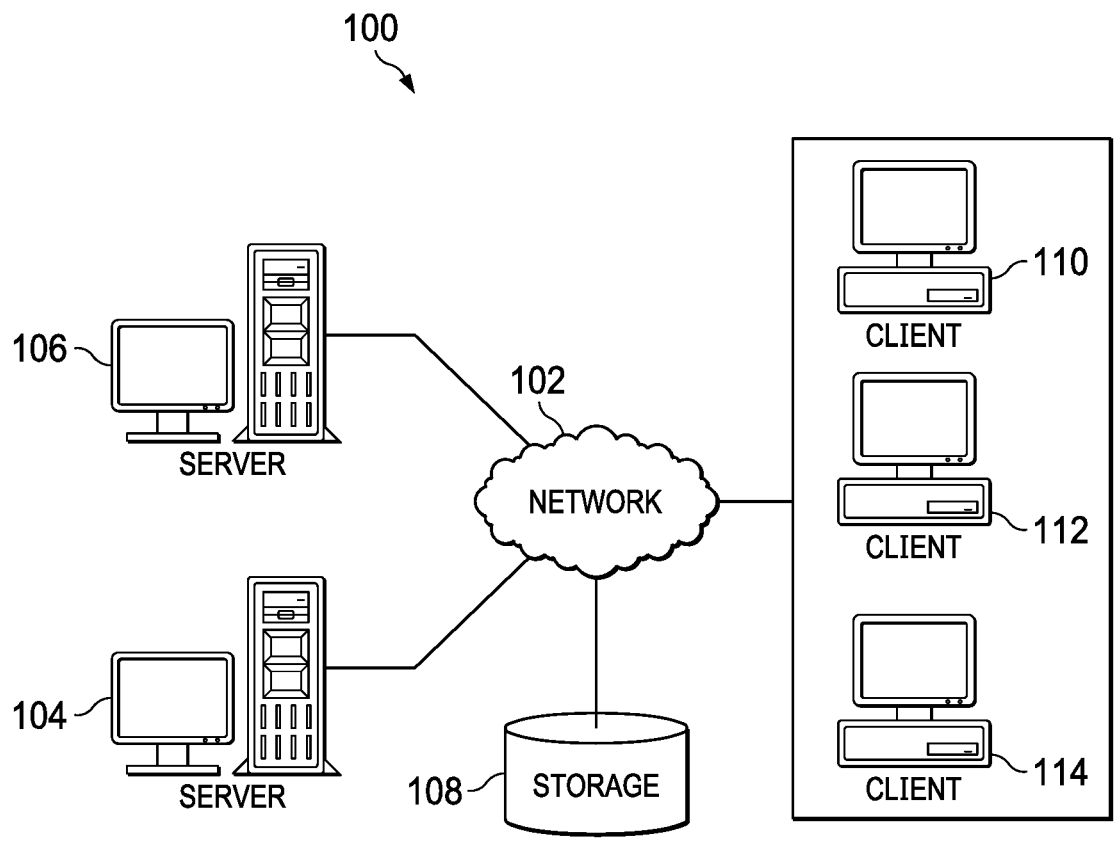
FIG. 1 is a diagram of a data processing environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation, with regard to the environments in which the different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

Figure 2:
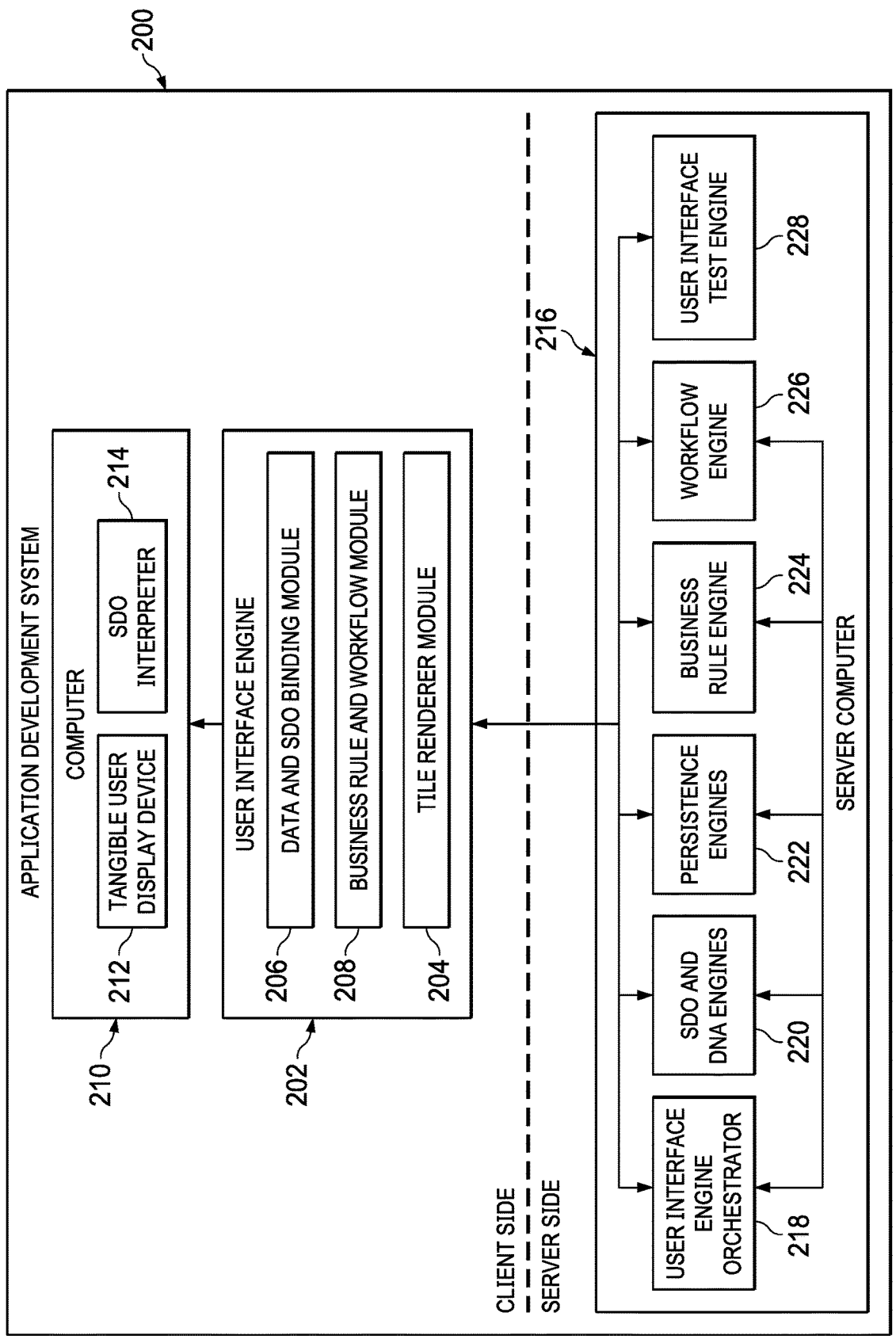
FIG. 2 is a block diagram of an application development system for a domain-specific language entirely composed of structured data objects in accordance with an illustrative embodiment.

FIG. 2 is a block diagram illustrating an application development system for a domain-specific language entirely composed of structured data objects, in accordance with an illustrative embodiment. Application development system 200 may be used to manipulate composable data nodes to build at least one of business rules, miniapps, and apps. Application development system 200 can be implemented in one or more of server computer 104, client computer 110, client computer 112, and client computer 114 of FIG. 1.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

User interface engine 202 is computer code and underlying data and structured data object which provide underlying functionality and implementation capability for application designers. Primarily, user interface engine 202 operates client-side, meaning that user interface engine 202 operates on a specific client user's computer. In one illustrative example, user interface engine 202 could be a Web browser or an extension to a Web browser.

Underlying the user interface, user interface engine 202 may include one or more modules. As depicted, user interface engine 202 includes tile renderer module 204, data and structured data object binding module 206, and business rule and workflow module 208. Each module may be considered a collection of software or computer code which implements the functionality of the module.

Tile renderer module 204 is computer code which computer 210 may use to render tiles on tangible user display device 212. Tile renderer module 204 may receive input from the user, from data and structured data object binding module 206, and from business rule and workflow module 208 to change and manipulate both the functionality of computer 210, which is used to execute tile renderer module 204, as well as tangible user display device 212, which is used to display rendered tiles.

Data and structured data object binding module 206 is computer code which computer 210 may use to bind data and structured data objects to the user interface, possibly a browser, so that user interface engine 202 may keep track of all of the data and structured data objects used in executing business rules and workflows, as well as rendering tiles. Additional details regarding the functionality of data and structured data object binding module 206 is described below with respect to how data and structured data objects are used in user interface engine 202.

Business rule and workflow module 208 is computer code which computer 210 may use to create, join, merge, or otherwise manipulate composable data nodes in order to create miniapps, collections, and bundles.

Business rule and workflow module 208, using data and structured data objects tracked by data and structured data object binding module 206, is the underlying code which allows a user to manipulate tiles rendered by tile renderer module 204 and thereby create miniapps, collections, and bundles without the user having to code any of the software being developed. Business rule and workflow module 208 may use composable data nodes, together with work flows and business rules to create the miniapps, collections, or bundles in a user-perceived codeless development environment.

Structured data object interpreter 214 is hardware or software which is used to interpret or execute business rules in a business system. Structured data object interpreter 214 can be software residing in a Web browser on computer 210. However, the illustrative embodiments are not necessarily limited to only client computers or Web browsers.

Structured data object interpreter 214 is a code interpreter designed for a domain-specific language entirely composed of structured data objects. In one illustrative example, structured data object interpreter 214 takes the form of an abstract syntax tree (AST) interpreter with the exception that the abstract syntax tree (AST) structure is composed of well-defined data nodes constructs, joined together in a domain-specific language. Because the data node constructs are well-defined when they are constructed, structured data object interpreter 214 executes the composition of structured data objects without compilation. Data note constructs are composed into well-defined structured data objects according to selected block types and properties, replacing the tokenization and parsing that would otherwise occur during compilation.

In some illustrative embodiments, user interface engine 202 may take advantage of some server side services operating on one or more server computers, such as server computer 216. "Server side" means that computer 210 communicates with server computer 216, possibly over a network such as the Internet. Server side resources are provided to support user interface engine 202. While not always necessary for implementation of user interface engine 202, server side resources can enhance the functionality of user interface engine 202.

For example, the server side resources may include user interface engine orchestrator 218. In some exemplary illustrative embodiments, user interface orchestrator 218 may be considered part of user interface engine 202 such that user interface engine 202 operates partially both on computer 210, but also on one or more server computers, such as server computer 216.

User interface orchestrator 218 may serve as a proxy to speed up processing of user interface engine 202. User interface orchestrator 218 may retrieve structured data objects and then identify whether data queries are for customer data, business rules, or any other structured data objects. User interface orchestrator 218 may then request such data, objects, or code, from the data center operating server side. User interface orchestrator 218 may cache retrieved data, structured data objects, code, workflows, or objects to be sent back to user interface engine 202.

Server side services may include other components other than user interface orchestrator 218. For example, server side resources could include one or more structured data object and DNA engines 220, which can be used to manage or provide structured data objects for use in user interface engine 202. Server side resources may also include one or more persistence engines 222, which can be used to save work done using user interface engine 202. Server side resources may also include business rule engine 224, which may be used to create or store business rules that are used by user interface engine 202 in the user-perceived codeless building of miniapps, collections, and bundles.

Server side resources may also include workflow engine 226, which may be used to create or store workflows that are used by user interface engine 202 in the user-perceived codeless building of miniapps, collections, and bundles.

Server side resources may also include user interface test engine 228, which may be used to test both the functionality of user interface engine 202, possibly as well as the miniapps, collections, and bundles created using user interface engine 202.

Figure 3:
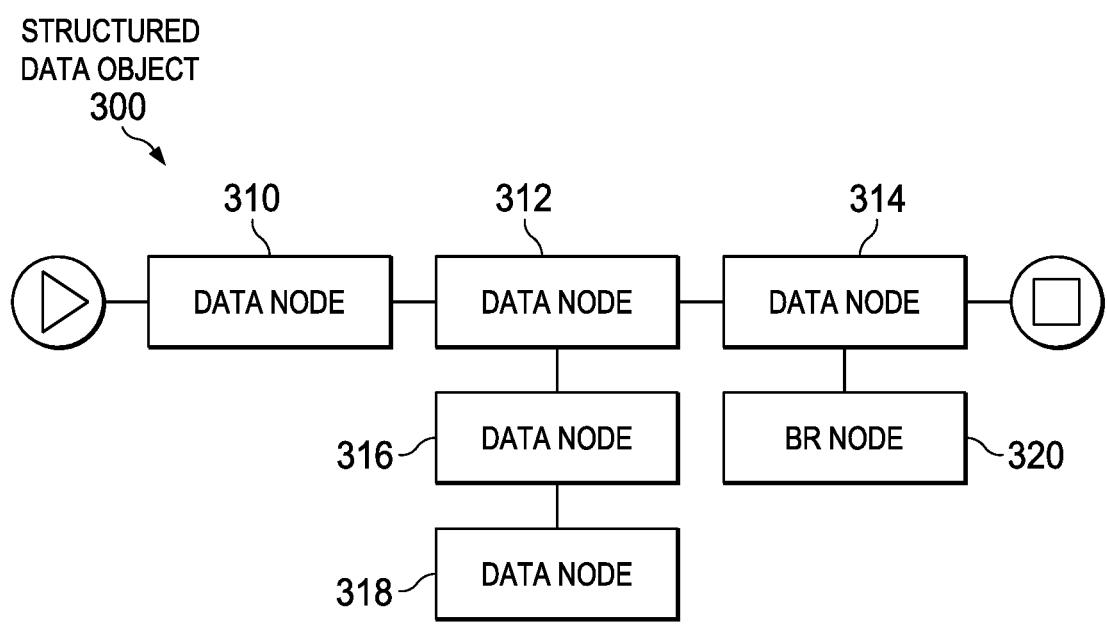
FIG. 3 is a block diagram of a structured data object in accordance with an illustrative embodiment.

With reference next to FIG. 3, an illustration of a block diagram of a structured data object is depicted in accordance with an illustrative embodiment. Structured data object 300 is an example of a composition of well-defined data nodes that can be linked together according to a domain specific language to create miniapps, collections, or bundles in a user-perceived codeless development environment, such as application development system 200 of FIG. 2.

Structured data object 300 includes data nodes 310, 312, and 314. Data nodes 310, 312, and 314 are well-defined structured data objects that can be manipulated within data and structured data binding module 206 of FIG. 2 to create desired business rules. Tile renderer module 204 of user interface engine 202 may visually present data nodes 310, 312, and 314, enabling the user to build different business rules, miniapps and apps in application development system 200 of FIG. 2. Each of data nodes 310, 312, and 314 correlate to one or more functions, which in turn can be interpreted by structured data object interpreter 214 of FIG. 2 for implementing the corresponding business rule. The different permutations of the compositions of these functions, as well as differentiated input, enable the execution of the different business rule behaviors at runtime.

The functions of data nodes 310, 312, and 314 operate inside of a context defined at the beginning of the business rule execution step, which is the target object for all symbols defined in the course of the business rule execution, as well as for all input to and output from the business rule itself. In this manner, data nodes 310, 312, and 314 act as a configuration object to the code being executed, defining an execution context (or scope being executed against) to other joined data nodes.

For example, structured data object 300 further includes data node 316. Data node 316 provides additional context for execution of related data node 312. Specifically, data node 316 may indicate that data node 312, as well as child data nodes thereof, should be interpreted within the context of data node 316.

Structured data object 300 further includes data node 318. Data node 318 provides additional context for execution of both related data node 312 and data node 316. For example, data node 318 may indicate that information required for execution of data node 312 should be requested and received from one or more web services. Data node 318 requests and returns the same context updated with the information received through the web services.

Structured data object 300 further includes business rule node 320. Business rule node 320 provides additional context for execution of related data node 314. Specifically, business rule node 320 may indicate a consuming service for receipt of business rule output provided by related data node 314. Business rule node 320 requests and returns information to a consuming service, such as a web page.

Figure 4:
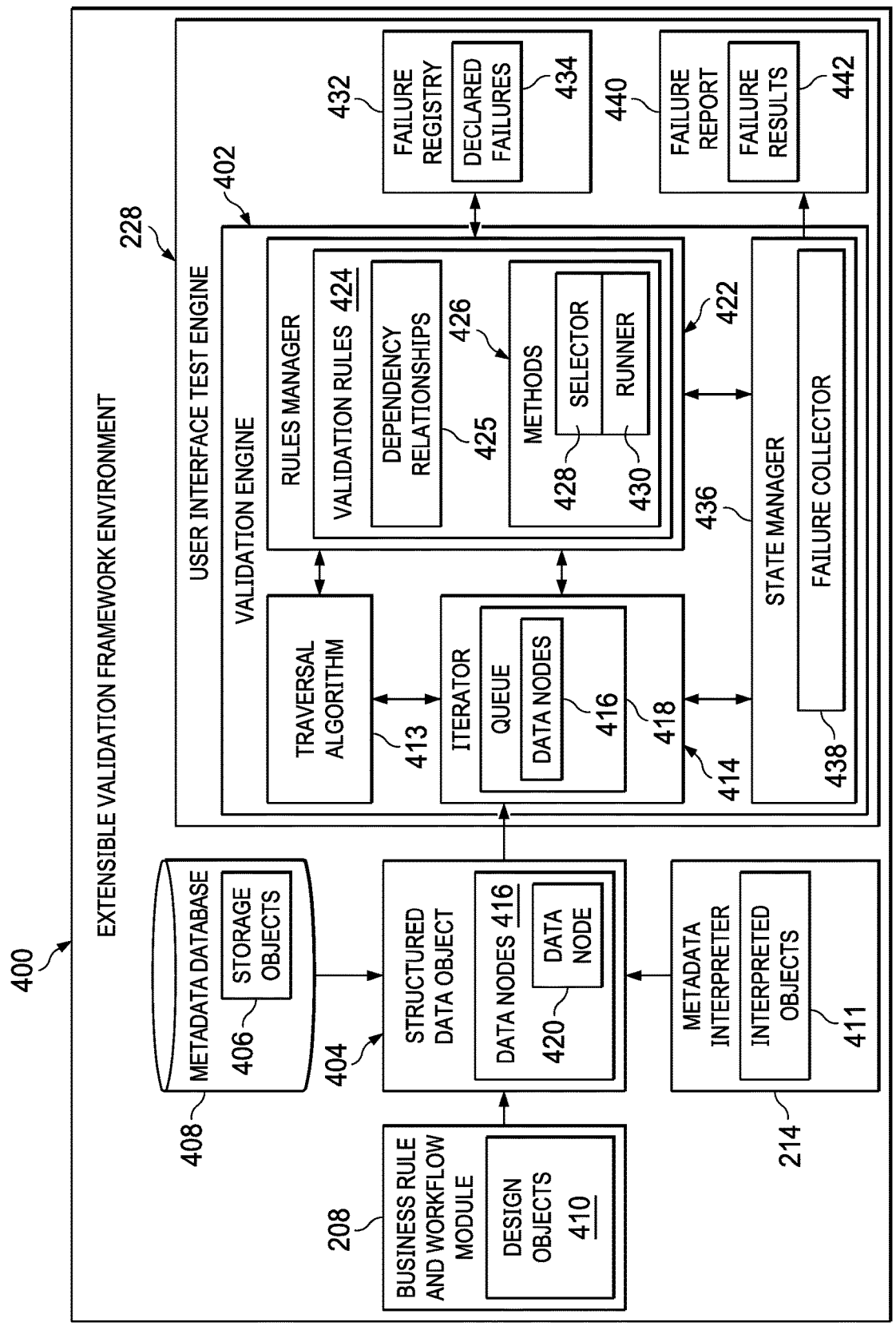
FIG. 4 is a block diagram of an extensible validation framework environment according to an illustrative example.

With reference next to FIG. 4, a block diagram of an extensible validation framework environment is depicted according to an illustrative example. Extensible validation framework environment 400 provides a flexible and extensible validation engine 402. Validation engine 402 allows for compositions of data nodes to be seamlessly introduced and validated in a user-perceived codeless development environment, such as application development system 200 of FIG. 2.

As depicted, validation engine 402 can be implemented as part of user interface test engine 228 of FIG. 2. Application development system 200 of FIG. 2 allows for applications to be written following a domain specific language entirely composed of structured data objects. The structured data objects needs to follow certain rules that govern the validity of applications developed using the domain specific language. Whenever new data nodes or groups of data nodes are created, validation engine 402 validates both individual and composed data nodes within extensible validation framework environment 400.

Validation engine 402 can validate interrelationships among data nodes of a structured data object, such as structured data object 300 of FIG. 3. In one illustrative example, validation engine 402 can also validate interrelationships between the structured data object and other structured data that exists in the system, such as any other structured data that references the structured data object, or that is referenced by the structured data object. In one illustrative example, validation engine 402 could even seek information external to the system, and validate the structured data object against the external information.

By validating the data nodes, validation engine 402 enforces structural and behavioral rules for structured data objects, thereby preventing the creation of invalid data objects used in the domain specific language. Additionally, by validating the data nodes, validation engine 402 ensures that data nodes, business rules, miniapps, and apps are interpreted and executed in a predictable manner, thereby providing consistent data objects for consumption by structured data object interpreter 214 of FIG. 2.

Validation engine 402 may be implemented in software, hardware, firmware, or a combination thereof. When software is used, the operations performed by validation engine 402 may be implemented in program code configured to run on hardware, such as a processor unit. When firmware is used, the operations performed by validation engine 402 may be implemented in program code and data and stored in persistent memory to run on a processor unit. When hardware is employed, the hardware may include circuits that operate to perform the operations in validation engine 402.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In one illustrative example, validation engine 402 includes a number of different components. As used herein, "a number of" components means one or more different components. As depicted, validation engine 402 includes iterator 414, rules manager 422, and state manager 436.

In one illustrative example, validation engine 402 validates structured data object 404. Structured data object 404 is a composition of data nodes 416, linked together according to a domain specific language. Structured data object 404 includes a set of data nodes 416 that are defined by a domain-specific language entirely consisting of composable data nodes. For example, data nodes 416 can include one or more of data nodes 310, 312, 314, 316, 318 and business rule node 320 of FIG. 3.

In one illustrative example, validation engine 402 identifies a set of validation rules 424 for validating interrelationships among data nodes 416. Validation engine 402 can identify validation rules 424 indicated in rules manager 422. Validation rules 424 govern the validity of applications developed using the domain specific language of application development system 200 of FIG. 2. Validation engine 402 applies validation rules 424 to validate both individual and composed data nodes within structured data object 404 according to the domain specific language of extensible validation framework environment 400.

In one illustrative example, validation engine 402 topologically sorts the set of validation rules 424 according to dependency relationships 425 declared in the set of validation rules 424. Dependency relationships 425 are specified in the implementation of corresponding validation rules 424, as defined by the domain specific language. Dependency relationships 425 define an execution order for the set of validation rules 424. For example, a first dependency relationship defined in a first validation rule may specify that the first validation rule should be executed before a second validation rule. Similarly, second dependency relationship defined in the second validation rule may specify that the second validation rule should be executed before a third validation rule.

Each of validation rules 424 implements at least two methods 426: selector 428 and runner 430. Selector 428 is responsible for filtering validation rules 424 that should be run when validating the different data nodes 416. Runner 430 determines whether the data node 420 of structured data object 404 fails the corresponding one of validation rules 424.

Validation engine 402 receives structured data object 404. The structured data object 404 consists of a set of data nodes 416. Data nodes 416 are interrelated within structured data object 404.

Validation engine 402 can receive structured data object 404 from a number of different sources. For example, validation engine 402 can receive structured data object 404 from at least one of structured data object database 408, business rule and workflow module 208, and structured data object interpreter 214.

The domain specific language allows for different permutations of the same data nodes, which means that the format of storage objects 406, including rules, miniapps, and apps, may not be the same as the format of design objects 410. Likewise, the format of interpreted objects 411 may not be the same as the format of either storage objects 406 or the format of design objects 410.

For example, storage objects 406 can be a combination of one or more data nodes, arranged into a structured data object that defines a particular business rule, miniapp, or app, such as structured data object 300 of FIG. 3. Design objects 410 can be a combination of a number of storage objects 406, composed into a particular business rule, miniapp, or app using business rule and workflow module 208. Interpreted objects 411 are the interpreted tree structure, interpreted by structured data object interpreter 214, that can be natively consumed by a consuming service.

In this manner, validation engine 402 allows for receiving structured data object 404 in multiple formats, identifying the format of structured data object 404, and providing different code paths for the different structured object formats. Thus, validation engine 402 enables validation of individual data nodes and compositions of data nodes at design time, that define a particular business rule, miniapp, or app, as well as the interpreted data nodes at runtime.

Validation engine 402 traverses structured data object 404 according to traversal algorithm 413. Traversal algorithm 413 tracks the dependency relationships 425 among the set of data nodes 416. For example, traversal algorithm 413 may track the dependency relationships 425 among the set of data nodes 416 according to validation rules 424 as topologically sorted. Validation engine 402 inserts each data node 420 of the set of data nodes 416 into queue 418, according to traversal algorithm 413.

As depicted, validation engine 402 includes rules manager 422. For each data node of queue 418, such as data node 420, rules manager 422 applies one or more validation rules 424 to validate corresponding data nodes 416 in queue 418.

Validation rules 424 provide different code paths for the different formats of storage objects 406, and design objects 410, and interpreted objects 411. Thus, validation engine 402 enables validation of different formats of structured data objects.

For each data node 420 in queue 418, validation engine 402 identifies a subset of validation rules 424 that should be run on the data node 420. Rules manager 422 filters out any unselected validation rules 424 by running selector 428 of each validation rules 424, thereby identifying a subset of validation rules 424 that should be run on a corresponding data node of the set of data nodes 416. In one illustrative example, validation engine 402 executes selector 428 for each of validation rules 424 to identify the subset that should be run when validating the different data nodes 416. For example, given data node 420, selector 428 returns a Boolean indicating if the corresponding one of validation rules 424 should run in a data node 420.

For each data node 420 in queue 418, validation engine 402 runs the subset of validation rules 422, as identified by selector 428, within a context of the structured data object 404. Because validation rules 424 are topologically sorted, validation engine 402 runs the subset of validation rules 422 in an order that respects the contextual relationship requirements among data nodes 416 of the structured data object 404. The context is defined by validation rules 424, describing the characteristics that and the specific dependencies or structure that structured data object 404 should follow.

In one illustrative example, rules manager 422 runs the subset of validation rules 422 identified by selector 428, by calling the respective runner 430. By calling runner 430, validation engine 402 determines whether the individual data node 420 of data nodes 416 fails the corresponding one of validation rules 424.

Failure registry 432 contains all declared failures 434, enabling fine-grain control of declared failures 434 from a single place. For example, declared failures 434 can include fatal type failures, error type failures, and warning type failures. A data node can fail validation rules 424 in multiple ways, and different types of failures are allowed for the different validation rules 424.

Each runner 430 has access to the state manager 436, which contains failure collector 438 component for aggregating all rule failures. Responsive to identifying a rule failure by the data node, validation engine 402 records the rule failure for the data node. Each failure is recorded in the failure collector 438.

After each of data nodes 416 in queue 418 is validated, failure collector 438 generates failure report 440. Failure report 440 indicates failure results 442 for each data node 420 of the set of data nodes 416 in the structured data object 404.

In one illustrative example, each of failure results 442 can be represented as a row in a failure report 440. Failure report 440 may also contain information for fixing the issue that caused data node 416 to fail one or more of validation rules 424.

As a result, when implemented in a computer system, validation engine 402 operates as a special purpose computer system in which the validation engine enables validation of applications written following a domain specific language entirely composed of structured data objects. Validation engine 402 ensures that structured data objects 404 follow validation rules 424 that govern the validity of applications developed using the domain specific language. Therefore, validation engine 402 transforms a computer system into a special purpose computer system as compared to currently available general computer systems that do not have validation engine 402.

Figure 5:
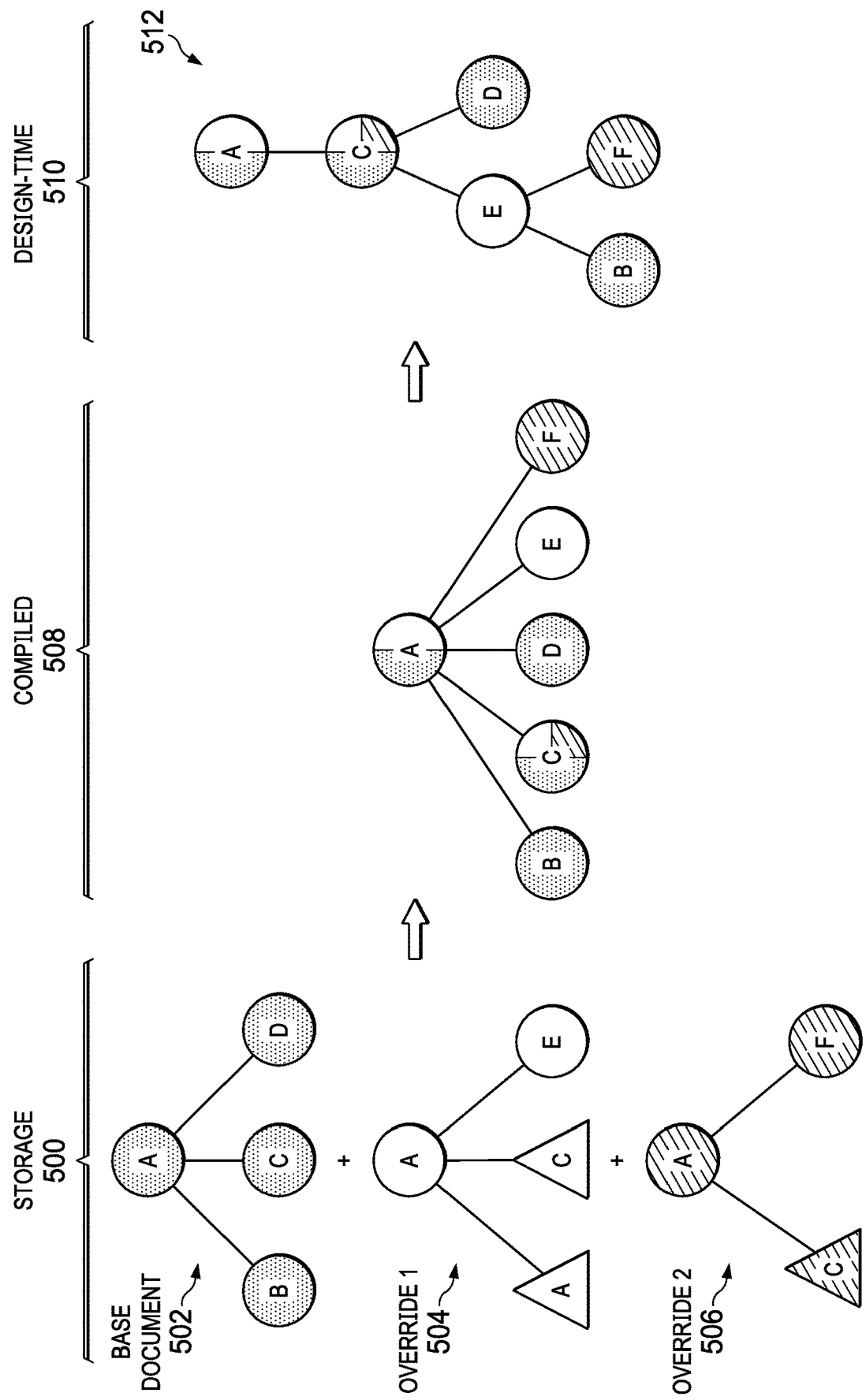
FIG. 5 is a diagram of different structured data object formats in accordance with an illustrative embodiment.

Referring next to FIG. 5, a diagram of different structured data formats is depicted according to an illustrative embodiment. Each node within the structured data objects is a data node.

As depicted, storage object 500 includes base data object 502, override data object 504, and override data object 506. Each of data objects 502-504 are examples of storage objects 406 of FIG. 4. Structured data object interpreter 214 can interpret storage object 500, creating runtime format metadata 508.

As depicted, design object 510 includes data object 512. Data object 512 is a combination of base data object 502, override data object 504, and override data object 506. Data object 512 is an example of design objects 410 of FIG. 4.

Figure 6:
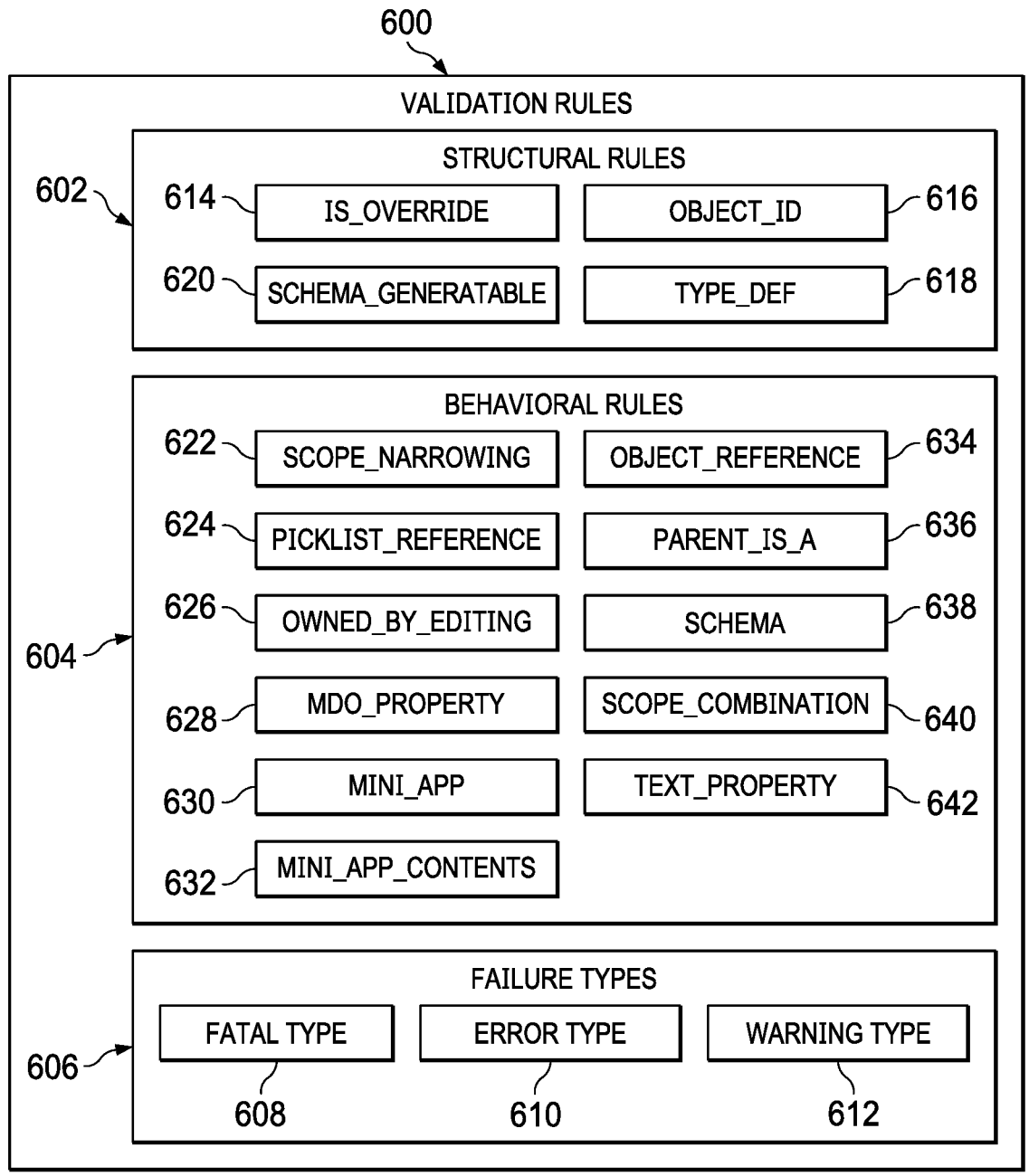
FIG. 6 is a block diagram of different validation rules and rule failures in accordance with an illustrative embodiment.

With reference next to FIG. 6, a block diagram of different validation rules and rule failures is depicted according to an illustrative embodiment. Validation rules 600 are examples of validation rules 424 of FIG. 4.

Validation rules 600 can include one or more different types of rules. As depicted, validation rules includes structural rules 602 and behavioral rules 604.

Structural rules 602 are static: every data node and structured data object defined by the domain specific language must follow structural rules 602. For example, structural rules 602 may relate to required properties, type definitions, schema generation, and object identification.

Behavioral rules 604 are dynamic: data nodes and structured data objects defined by the domain specific language should follow behavioral rules 604 only if certain conditions are met. For example, behavioral rules 604 may relate to schema validation, picklist validation, object references, embedded metadata object types, and object lineage.

Validation rules 600 allows for different failure types 606. As depicted, failure types 606 includes fatal type 608, error type 610, and warning type 612. Fatal type 608 indicate a required field or property that is necessary to create the structured data object. Error type 610 indicate an invalid metadata object. Warning type 612 indicates that a structured data object may become invalid depending on the execution context. Warning type 612 enables validation rules 600 be changed without breaking backwards compatibility.

In this illustrative example, structural rules 602 include a number of different rules. As depicted, structural rules 602 include is_override 614, object_ID 616, type_def 618, and schema_generatable 620.

Is_override 614 ensures that the_isoverride field is present on a data object. Is_override 614 applies to the top level data object to quickly select between base versus override storage data objects for a given object_ID.

A data object fails is_override 614 if the data object does not include an indication whether the data object is a base data object or an override data object. For example, a data object may fail is_override 614 if a corresponding field is missing from the specified data object.

Object_ID 616 ensures that a structured data object or data node has the _objectId field and it is valued. Object_ID 616 applies to all structured data object and the data nodes. The _objectId field is the unique identifier for a data object when paired with a mask at the top level. For structured data objects, it is the unique identifier for the structured data object within that structured data object.

A data object fails object_ID 616 if the data object does not include an unique identifier of the data object. For example, a data object may fail object_ID 616 if a corresponding field is missing from the specified data node or data object, Type_def 618 ensures that a typeId exists in structured data object and DNA engines 220 for the data object or structured data object. Type definitions govern the structure and content of a given data object and are necessary throughout the stack for structured data objects, validation notwithstanding. Type_def 618 applies to all data nodes and structured data objects.

A data object fails type_def 618 if type definitions for the data object can be located. For example, a data object may fail type_def 618 if a type identification on the specified data object or data node cannot be found in structured data object and DNA engines 220.

Schema_generatable 620 is run on all type and structured data object definitions. Schema_generatable 620 will attempt to generate a JSON schema from the definition.

Schema_generatable 620 will fail if any part of the generation process has an error. Schema_generatable 620 will throw an error for each schema generation error encountered. A data object fails schema_generatable 620 if the schema failed to generate from the given type or data node definition for one or more reasons. A failure of schema_generatable 620 can include additional error output specifying the reason for the failure.

For example, a failure of schema_generatable 620 can indicate that the type definition does not define any properties. A failure of schema_generatable 620 can indicate that the type definition does not define the name for a given property. A failure of schema_generatable 620 can indicate that the type definition's propertyType for this data node is not recognized. A failure of schema_generatable 620 can indicate that a type definition does not identify the types of object references that are expected for a defined property of the data object. A failure of schema_generatable 620 can indicate that a type definition identified invalid types of object references that are expected for a defined property of the data object.

In this illustrative example behavioral rules 604 include a number of different rules. As depicted, behavioral rules 604 include scope narrowing 622, picklist_reference 624, owned_by_editing 626, MDO_property 628, mini_app 630, mini_app_contents 632, object reference 634, parent_is_a 636, schema 638, scope combination 640, and text_property 642.

Scope_narrowing 622 ensures that a scoped data object does not have its scope narrowed without being on a new major miniapp version. Scope narrowing 622 applies to all top level data objects that have had a scope change from the existing data object passed in to validations.

A data object fails scope narrowing 622 if a scope of the data object is narrowed. For example, a data object can fail scope_narrowing 622 if a given data objects scope has narrowed without being saved to a new major version of the mini-app.

Picklist_reference 624 ensures that the picklist is defined and can be found, and that the values selected are in the picklist.

A data object fails picklist_reference 624 if the picklist ID defined in the property definition could not be found. For example, a data object can fail picklist_reference 624 if the picklist ID defined in the property definition is missing a base data object. Data object can fail picklist_reference 624 if the stored value on the property is not present in the picklist, or the data object does not define the 'picklistId'.

Owned_by_editing 626 ensures that the_ownedByEditing field exists on a given structured data object. It applies to all structured data object objects on a data object. The _ownedByEditing field is used while saving a data object to determine if the value of a structured data object is owned by the current editing capsule, or if it is inherited from an upper scope.

A data object fails owned_by_editing 626 if the data object does not include an indication whether if a value of a structured data object is owned by the current editing capsule, or if it is inherited from an upper scope. For example, a data object may fail owned_by_editing 626 if a corresponding field is missing from the specified data node.

MDO_property 628 validates contextual properties of the 'array' or 'MDO' type. It ensures that the child structured data object has '_typeId' defined, the type ID of the child structured data object is contained by the parent's 'objectOf', and that the property definition has defined the 'objectOf'.

A data object fails MDO_property 628 the child structured data object has undefined or missing properties. For example, a data object can fail MDO_property 628 based on a missing type ID in an embedded MDO. A data object can fail MDO_property 628 based on a type ID mismatch in an embedded MDO. A data object can fail MDO_property 628 based on a missing type ID in a child MDO. A data object can fail MDO_property 628 based on a type ID mismatch in a child MDO. A data object can fail MDO_property 628 based on a missing field definition for a defined property of the data object.

Mini_app 630 ensures that mini-apps with the same name have the same original miniapp ID's and mini-apps with the same original miniapp ID have the same name. mini_app 630 applies only to mini-app definitions.

A data object fails mini_app 630 if the mini-app's name is either already in use, or the original mini-app ID of the mini-app definition being validated has changed. A data object fails mini_app 630 if the mini-app's name differs from other definitions that share its original mini-app ID.

Mini_app_contents 632 validates the internal contents of mini-apps. The contents includes version ranges of other mini-apps, and a "manifest" which includes exact versions of those mini-apps.

A data object fails mini_app_contents 632 based on unidentified or duplicated identifications. For example, a data object can fail mini_app_contents 632 if the business mini-app's contents contain the same mini-app multiple times. A data object fails mini_app_contents 632 if the business mini-app's contents contains a mini-app that cannot be found. A data object fails mini_app_contents 632 if the business mini-apps contents contains a mini-app ID that is not the original mini-app ID. A data object fails mini_app_contents 632 if the business mini-app's contents contains a mini-app whose 'version' value is not a valid semantic version range. A data object fails mini_app_contents 632 if the business mini-app's manifest contains multiple mini-app's with the same original mini-app ID. A data object fails mini_app_contents 632 if the business mini-app's manifest contains a mini-app that could not be found.

Object reference 634 validates properties that are of type 'objectId'. Object_reference 634 ensures the reference exists and is of the correct type.

A data object fails object_reference 634 if the data object referenced by this property cannot be found. A data object fails object_reference 634 if the property definition fails to define its 'objectOf' field. A data object fails object reference 634 if the type of the object referenced in this property does not match any of the types defined in the objectOf.

Parent_is_a 636 determines if nested structured data object types conform to specified categories, allowing for softer hierarchy definitions without specifying exact typeIds. 'isA' refers to what child objects of that type can be, and 'isIn' defines the types of containers that can hold a specified type. Parent_is_a 636 applies to all structured data object objects in a given data object. Parent_is_a 636 is defined on the parent property definition, falling back to the type definition itself if the property does not have defined type identification.

A data object fails parent_is_a 636 if a child data node's parent could not be found. A data object fails parent_is_a 636 if a data node in this data object's type definition does not define any 'isA' contained by the 'isIn' of its data node. A data object fails parent_is_a 636 if a data node in this data object's type definition does not define any 'isA' contained by the 'isIn' of its data node. A data object fails parent_is_a 636 if the type definition of this data object defines an 'isA', however the data node definition fails to define an 'isIn.'

Schema 638 verifies that the data object or structured data object conforms to this schema and has basic required fields. schema 638 applies to all data nodes and structured data object objects.

For example, a data object fails schema 638 if the type definition does not define any properties. A data object fails schema 638 if the type definition does not define the name for a given property. A data object fails schema 638 if the type definition's propertyType for this data node is unsupported. A data object fails schema 638 if a type definition does not identify the types of object references that are expected for a defined property of the data object. A data object fails schema 638 if a type definition identifies invalid types of object references that are expected for a defined property of the data object.

Scope_combination 640 ensures that scoped data objects do not have their scope increased on override. Scope combination 640 applies to all top level data objects. A data object can fail scope_combination 640 if a given override for a data object has increased its scope over the base data object.

Text_property 642 validates that properties of type 'text' do not appear to be a universally unique identifier, or UUID. Those properties should be type 'objectId'.

A data object can fail text_property 642 if the text properties appear to be a unique identifier. This can occur when the text property is exactly 24 or 32 characters long, and contains only characters a-f, A-F, and 0-9.

Figure 7:
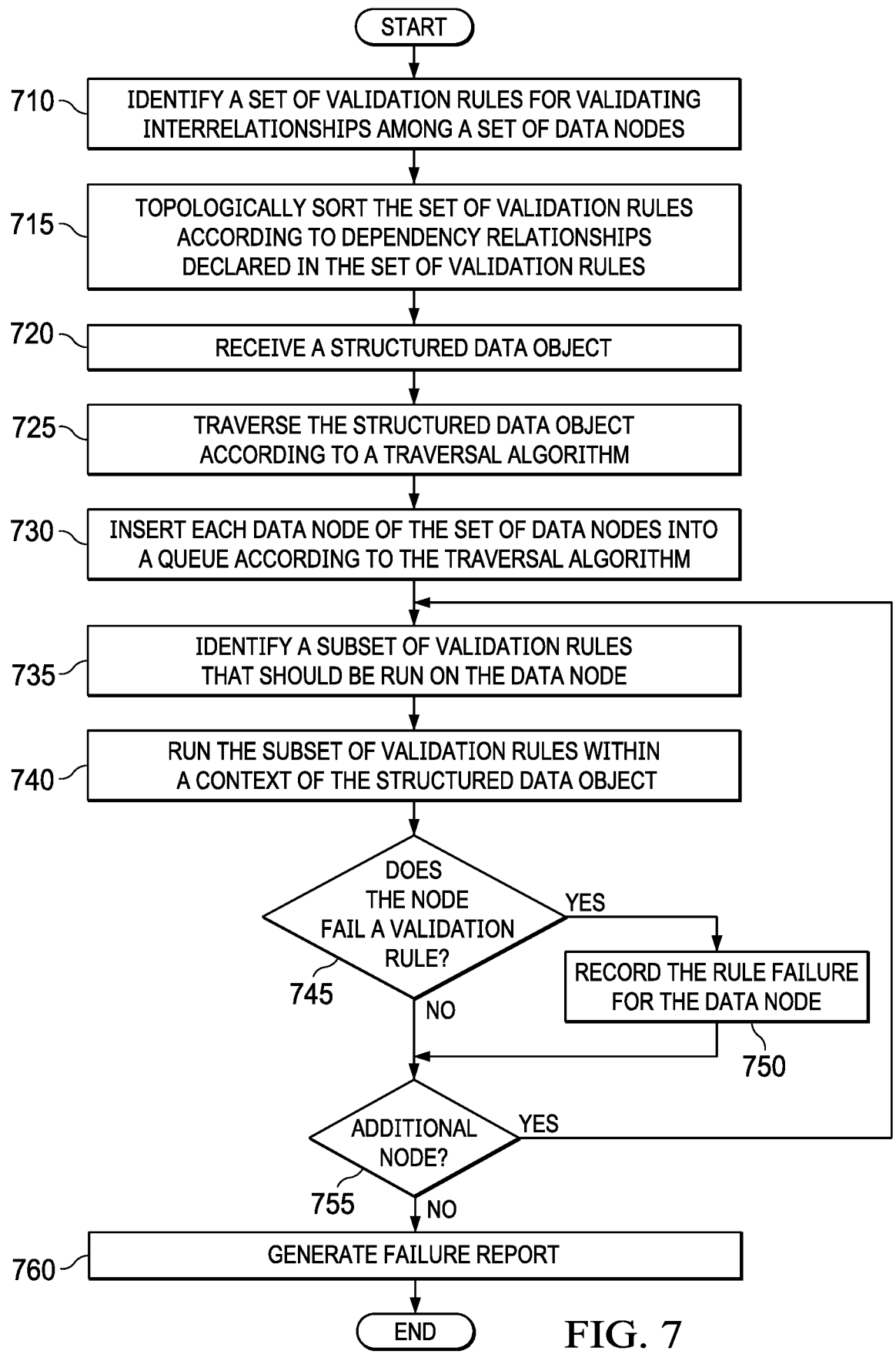
FIG. 7 is a flowchart of a process for validating a structured data object in accordance with an illustrative embodiment.

With reference next to FIG. 7, an illustration of a flowchart of a process for validating a structured data object is depicted in accordance with an illustrative embodiment. The process of FIG. 7 can be a software process implemented in one or more components of a user interface test engine for a domain specific language, such as user interface test engine 228 of FIG. 2.

The process begins by identifying a set of validation rules for validating interrelationships among a set of data nodes (step 710). The data nodes are composable into structured data objects according to a domain specific language.

Next, the process topologically sorts the set of validation rules according to dependency relationships declared in the set of validation rules (step 715). Afterwards, the process receives the structured data object (step 720). The structured data object consists of a set of data nodes that are interrelated within the structured data object.

The process then traverses the structured data object according to a traversal algorithm (step 725). The traversal algorithm tracks dependency relationships among the set of data nodes.

Next, process inserts each data node of the set of data nodes into a queue according to the traversal algorithm (step 730). Afterwards, the process identifies a subset of validation rules that should be run on the data node (step 735).

The process then runs the subset of validation rules within a context of the structured data object (step 740).

In response to identifying a rule failure by the node ("yes" at step 745), the process records the rule failure for the data node (step 750).

The process then repeats steps 735-750 for each node of the queue. If there is an additional node ("yes" at step 755), the process iterates back to step 735 to validate the next node of the metadata object queue.

Next, the process generates a failure report (step 760), with the process terminating thereafter. The failure report indicates failure results for each data node of the set of data nodes of the structured data object.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
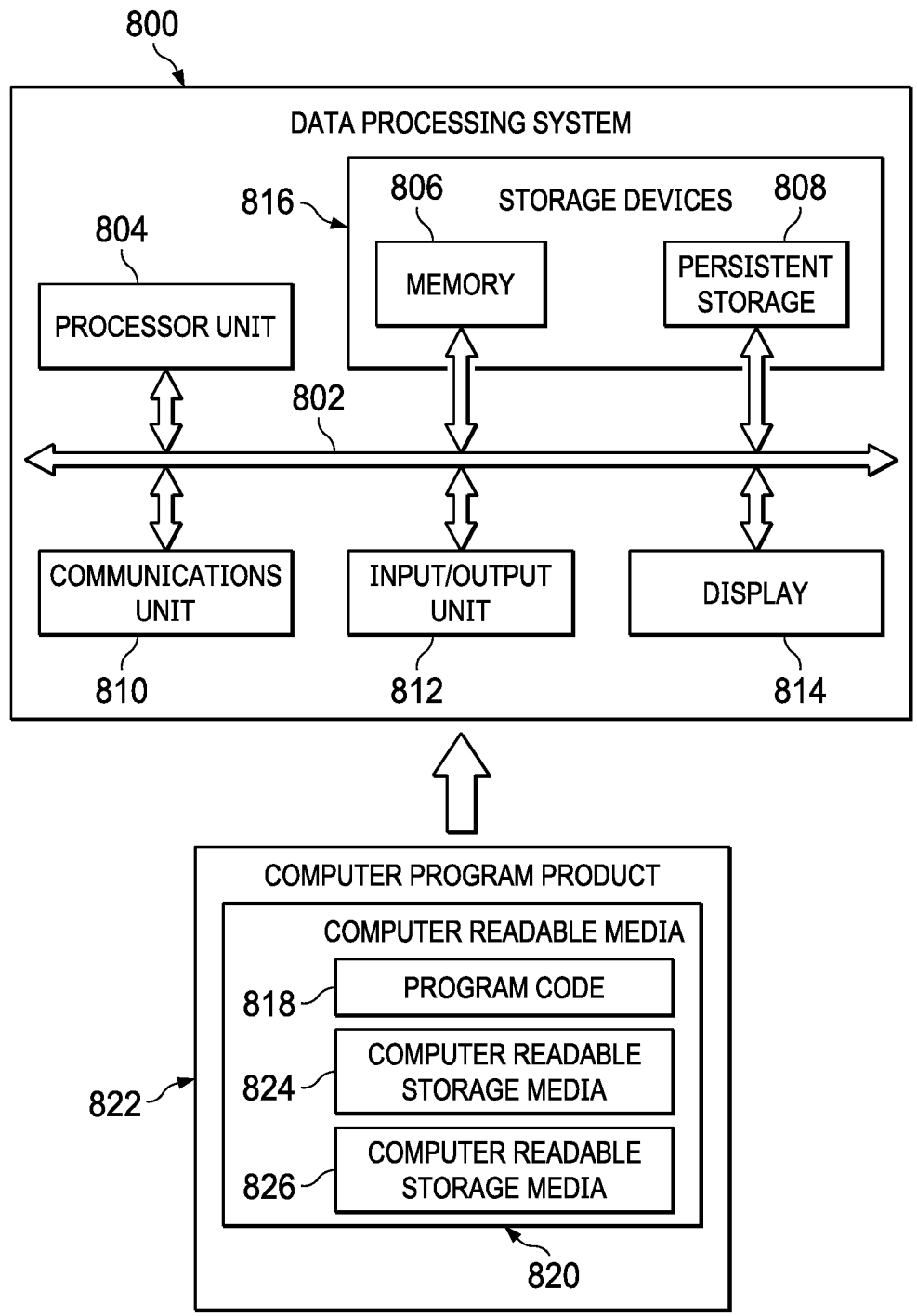
FIG. 8 is a block diagram of a data processing system in accordance with an illustrative embodiment.

Turning now to FIG. 8, an illustration of a block diagram of a data processing system is depicted in accordance with an illustrative embodiment. Data processing system 800 may be used to implement one or more of the computers of Network data processing system 100 in FIG. 1, computer 210 and server computer 216 of FIG. 2, as well as other data processing systems that may be used in extensible validation framework environment 400 of FIG. 4.

In this illustrative example, data processing system 800 includes communications framework 802, which provides communications between processor unit 804, memory 806, persistent storage 808, communications unit 810, input/output (I/O) unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a solid state hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these illustrative examples. In one example, computer readable media 820 may be computer readable storage media 824 or computer readable signal media 826.

In these illustrative examples, computer readable storage media 824 is a physical or tangible storage device used to store program code 818 rather than a medium that propagates or transmits program code 818.

Alternatively, program code 818 may be transferred to data processing system 800 using computer readable signal media 826. Computer readable signal media 826 may be, for example, a propagated data signal containing program code 818. For example, computer readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for validating a structured data object, the method comprising:
   identifying a set of validation rules for validating interrelationships among data nodes, wherein the data nodes are composable into structured data objects according to a domain specific language;
   topologically sorting the set of validation rules according to dependency relationships declared in the set of validation rules;
   receiving the structured data object, wherein the structured data object comprises a set of data nodes that are interrelated within the structured data object;
   traversing the structured data object according to a traversal algorithm, wherein the traversal algorithm tracks dependency relationships among the set of data nodes;
   inserting each data node of the set of data nodes into a queue according to the traversal algorithm;
   for each data node in the queue:
      identifying a subset of validation rules that should be run on the data node;
      running the subset of validation rules within a context of the structured data object; and
      responsive to identifying a rule failure by the data node, recording the rule failure for the data node; and
   generating a failure report, wherein the failure report indicates failure results for each data node of the set of data nodes of the structured data object,
   wherein identifying the subset of validation rules, running the subset of validation rules, and recording the rule failure are iteratively performed for each data node in the queue.

2. The method of claim 1, wherein the structured data object comprises:
   a base data object comprising a first set of data nodes; and
   an override data object comprising a second set data nodes that override properties of the first set of data nodes, a context for the structured data object defined by the validation rules.

3. The method of claim 1, wherein identifying the subset of validation rules further comprises:
   identifying the subset of validation rules from a set of validation rules, the set of validation rules comprising a set of structural rules for the structured data object and a set of behavioral rules for the structured data object.

4. The method of claim 3, wherein the set of structural rules comprises:
   a first rule that validates an override indication for the structured data object;
   a second rule that validates a unique identifier for the structured data object;
   a third rule that validates schema generation for the structured data object; and
   a fourth rule that validates a type definition indication for the structured data object.

5. The method for validating a structured data object of claim 1, wherein identifying the subset of validation rules further comprises:
   identifying the subset of validation rules from a set of validation rules, the set of validation rules comprising a set of structural rules for the structured data object and a set of behavioral rules for the structured data object.

6. The method of claim 2, wherein identifying the subset of validation rules further comprises:
   identifying the subset of validation rules from a set of validation rules, the set of validation rules comprising a set of structural rules for the structured data object and a set of behavioral rules for the structured data object.

7. A method for validating a structured data object, the method comprising:
   identifying a set of validation rules for validating interrelationships among data nodes, wherein the data nodes are composable into structured data objects according to a domain specific language;
   topologically sorting the set of validation rules according to dependency relationships declared in the set of validation rules;
   receiving the structured data object, wherein the structured data object comprises a set of data nodes that are interrelated within the structured data object;
   traversing the structured data object according to a traversal algorithm, wherein the traversal algorithm tracks dependency relationships among the set of data nodes;
   inserting each data node of the set of data nodes into a queue according to the traversal algorithm;
   for each data node in the queue:

identifying a subset of validation rules that should be run on the data node;

running the subset of validation rules within a context of the structured data object; and responsive to identifying a rule failure by the data node, recording the rule failure for the data node; and generating a failure report, wherein the failure report indicates failure results for each data node of the set of data nodes of the structured data object, wherein identifying the subset of validation rules further comprises:

identifying the subset of validation rules from a set of validation rules, the set of validation rules comprising a set of structural rules for the structured data object and a set of behavioral rules for the structured data object, wherein the set of behavioral rules comprises:

a first rule that validates contextual properties for the structured data object;

a second rule that validates a name of the structured data object;

a third rule that validates internal contents of the structured data object;

a fourth rule that validates object references within the structured data object;

a fifth rule that validates ownership of a particular metadata object by the structured data object;

a sixth rule that validates object types of nested metadata objects within the structured data object;

a seventh rule that validates picklist references within the structured data object;

an eighth rule that validates schema conformance of the structured data object;

a ninth rule that validates a scope expansion for the structured data object and an override data object;

a tenth rule that validates the scope narrowing for the structured data object; and an eleventh rule that validates text properties for the structured data object.

8. A computer system for validating a structured data object, the computer system comprising:

a hardware processor; and a validation engine in communication with the hardware processor, wherein the validation engine:

identifies a set of validation rules for validating interrelationships among data nodes, wherein the data nodes are composable into structured data objects according to a domain specific language;

topologically sorts the set of validation rules according to dependency relationships declared in the set of validation rules;

receives the structured data object, wherein the structured data object comprises a set of data nodes that are interrelated within the structured data object;

traverses the structured data object according to a traversal algorithm, wherein the traversal algorithm tracks dependency relationships among the set of data nodes;

inserts each data node of the set of data nodes into a queue according to the traversal algorithm;

for each data node in the queue:

identifies a subset of validation rules that should be run on the data node;

runs the subset of validation rules within a context of the structured data object; and responsive to identifying a rule failure by the data node, records the rule failure for the data node; and generates a failure report, wherein the failure report indicates failure results for each data node of the set of data nodes of the structured data object, wherein identifies the subset of validation rules, runs the subset of validation rules, and records the rule failure are iteratively performed for each data node in the queue.

9. The computer system of claim 8, wherein the structured data object comprises:

a base data object comprising a first set of data nodes; and an override data object comprising a second set data nodes that override properties of the first set of data nodes, a context for the structured data object defined by the validation rules.

10. The computer system of claim 8, wherein identifying the subset of validation rules further comprises:

identifying the subset of validation rules from a set of validation rules, the set of validation rules comprising a set of structural rules for the structured data object and a set of behavioral rules for the structured data object.

11. The computer system of claim 10, wherein the set of structural rules comprises:

a first rule that validates an override indication for the structured data object;

a second rule that validates a unique identifier for the structured data object;

a third rule that validates schema generation for the structured data object; and a fourth rule that validates a type definition indication for the structured data object.

12. The computer system for validating a structured data object of claim 8, wherein identifying the subset of validation rules further comprises:

identifying the subset of validation rules from a set of validation rules, the set of validation rules comprising a set of structural rules for the structured data object and a set of behavioral rules for the structured data object.

13. The computer system of claim 7, wherein identifying the subset of validation rules further comprises:

identifying the subset of validation rules from a set of validation rules, the set of validation rules comprising a set of structural rules for the structured data object and a set of behavioral rules for the structured data object.

14. A computer system for validating a structured data object, the computer system comprising:

a hardware processor; and a validation engine in communication with the hardware processor, wherein the validation engine:

identifies a set of validation rules for validating interrelationships among data nodes, wherein the data nodes are composable into structured data objects according to a domain specific language;

topologically sorts the set of validation rules according to dependency relationships declared in the set of validation rules;

receives the structured data object, wherein the structured data object comprises a set of data nodes that are interrelated within the structured data object;

traverses the structured data object according to a traversal algorithm, wherein the traversal algorithm tracks dependency relationships among the set of data nodes;

inserts each data node of the set of data nodes into a queue according to the traversal algorithm;

for each data node in the queue:

identifies a subset of validation rules that should be run on the data node;
runs the subset of validation rules within a context of the structured data object; and
responsive to identifying a rule failure by the data node, records the rule failure for the data node; and
generates a failure report, wherein the failure report indicates failure results for each data node of the set of data nodes of the structured data object,
wherein identifying the subset of validation rules further comprises:
identifying the subset of validation rules from a set of validation rules, the set of validation rules comprising a set of structural rules for the structured data object and a set of behavioral rules for the structured data object,
wherein the set of behavioral rules comprises:
a first rule that validates contextual properties for the structured data object;
a second rule that validates a name of the structured data object;
a third rule that validates internal contents of the structured data object;
a fourth rule that validates object references within the structured data object;
a fifth rule that validates ownership of a particular metadata object by the structured data object;
a sixth rule that validates object types of nested metadata objects within the structured data object;
a seventh rule that validates picklist references within the structured data object;
an eighth rule that validates schema conformance of the structured data object;
a ninth rule that validates a scope expansion for the structured data object and an override data object;
a tenth rule that validates the scope narrowing for the structured data object; and
an eleventh rule that validates text properties for the structured data object.

15. A computer program product for validating a structured data object, the computer program product comprising:
a non-transitory computer readable storage media;
program code, stored on the computer readable storage media, for identifying a set of validation rules for validating interrelationships among data nodes, wherein the data nodes are composable into structured data objects according to a domain specific language;
program code, stored on the computer readable storage media, for topologically sorting the set of validation rules according to dependency relationships declared in the set of validation rules;
program code, stored on the computer readable storage media, for receiving the structured data object, wherein the structured data object comprises a set of data nodes that are interrelated within the structured data object;
program code, stored on the computer readable storage media, for traversing the structured data object according to a traversal algorithm, wherein the traversal algorithm tracks dependency relationships among the set of data nodes;
program code, stored on the computer readable storage media, for inserting each data node of the set of data nodes into a queue according to the traversal algorithm;
for each data node in the queue:
program code, stored on the computer readable storage media, for identifying a subset of validation rules that should be run on the data node;
program code, stored on the computer readable storage media, for running the subset of validation rules within a context of the structured data object; and
program code, stored on the computer readable storage media, for responsive to identifying a rule failure by the data node, recording the rule failure for the data node; and
program code, stored on the computer readable storage media, for generating a failure report, wherein the failure report indicates failure results for each data node of the set of data nodes of the structured data object,
wherein the program code for identifying the subset of validation rules, the program code for running the subset of validation rules, and the program code for recording the rule failure are iteratively performed for each data node in the queue.

16. The computer program product of claim 15, wherein the structured data object comprises:
a base data object comprising a first set of data nodes; and
an override data object comprising a second set data nodes that override properties of the first set of data nodes, a context for the structured data object defined by the validation rules.

17. The computer program product of claim 15, wherein the program code for identifying the subset of validation rules further comprises:
program code for identifying the subset of validation rules from a set of validation rules, the set of validation rules comprising a set of structural rules for the structured data object, and a set of behavioral rules for the structured data object.

18. The computer program product of claim 17, wherein the set of structural rules comprises:
a first rule that validates an override indication for the structured data object;
a second rule that validates a unique identifier for the structured data object;
a third rule that validates schema generation for the structured data object; and
a fourth rule that validates a type definition indication for the structured data object.

19. The computer program product of claim 15, wherein the program code for identifying the subset of validation rules further comprises:
program code for identifying the subset of validation rules from a set of validation rules, the set of validation rules comprising a set of structural rules for the structured data object, and a set of behavioral rules for the structured data object.

20. The computer program product of claim 16, wherein the program code for identifying the subset of validation rules further comprises:
program code for identifying the subset of validation rules from a set of validation rules, the set of validation rules comprising a set of structural rules for the structured data object, and a set of behavioral rules for the structured data object.

21. A computer program product for validating a structured data object, the computer program product comprising:
a non-transitory computer readable storage media;
program code, stored on the computer readable storage media, for identifying a set of validation rules for validating interrelationships among data nodes, wherein the data nodes are composable into structured data objects according to a domain specific language;

program code, stored on the computer readable storage media, for topologically sorting the set of validation rules according to dependency relationships declared in the set of validation rules;

program code, stored on the computer readable storage media, for receiving the structured data object, wherein the structured data object comprises a set of data nodes that are interrelated within the structured data object;

program code, stored on the computer readable storage media, for traversing the structured data object according to a traversal algorithm, wherein the traversal algorithm tracks dependency relationships among the set of data nodes;

program code, stored on the computer readable storage media, for inserting each data node of the set of data nodes into a queue according to the traversal algorithm;

for each data node in the queue:
  program code, stored on the computer readable storage media, for identifying a subset of validation rules that should be run on the data node;
  program code, stored on the computer readable storage media, for running the subset of validation rules within a context of the structured data object; and
  program code, stored on the computer readable storage media, for responsive to identifying a rule failure by the data node, recording the rule failure for the data node; and program code, stored on the computer readable storage media, for generating a failure report, wherein the failure report indicates failure results for each data node of the set of data nodes of the structured data object, wherein the program code for identifying the subset of validation rules further comprises:
  program code for identifying the subset of validation rules from a set of validation rules, the set of validation rules comprising a set of structural rules for the structured data object, and a set of behavioral rules for the structured data object, wherein the set of behavioral rules comprises:
  a first rule that validates contextual properties for the structured data object;
  a second rule that validates a name of the structured data object;
  a third rule that validates internal contents of the structured data object;
  a fourth rule that validates object references within the structured data object;
a fifth rule that validates ownership of a particular metadata object by the structured data object;
  a sixth rule that validates object types of nested metadata objects within the structured data object;
  a seventh rule that validates picklist references within the structured data object;
  an eighth rule that validates schema conformance of the structured data object;
  a ninth rule that validates a scope expansion for the structured data object and an override data object;
  a tenth rule that validates the scope narrowing for the structured data object; and
  an eleventh rule that validates text properties for the structured data object.

* * * * *